Figure 1:
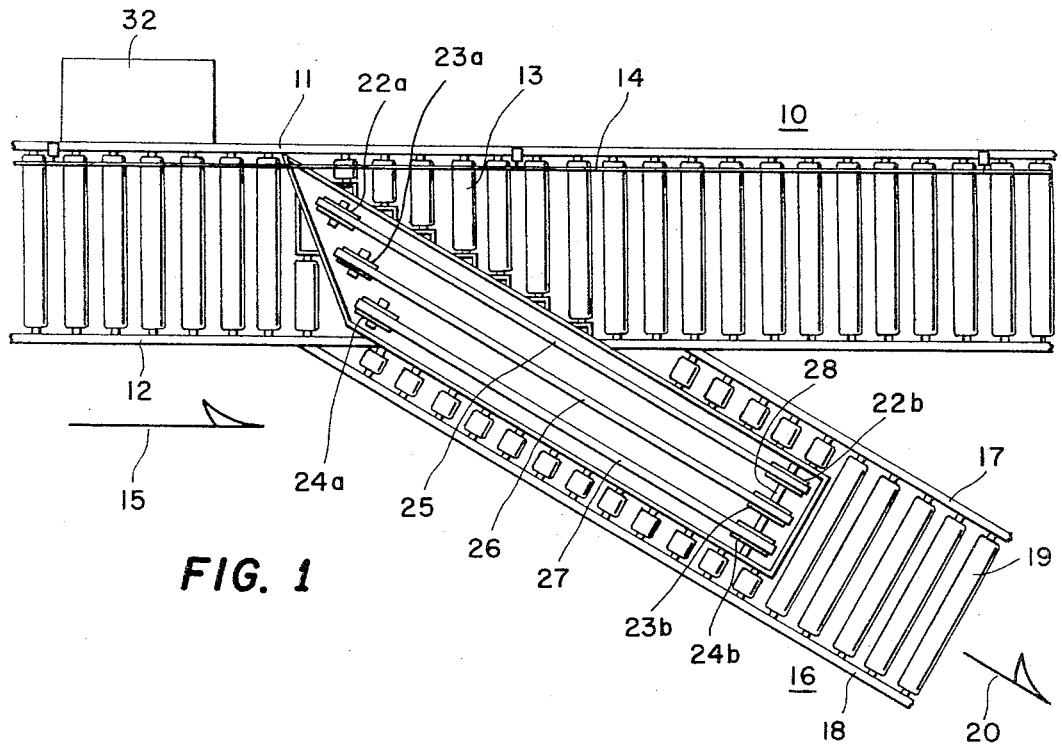

Feb. 14, 1967  J. W. DAVIS  3,303,923

CONVEYOR DIVERTER MECHANISM

Filed Aug. 14, 1964

INVENTOR.
JOSEPH W. DAVIS
BY Alfred Stapley
ATTORNEY

United States Patent Office 3,303,923
Patented Feb. 14, 1967

3,303,923
CONVEYOR DIVERTER MECHANISM
Joseph W. Davis, Chester Heights, Pa., assignor to General Atronics Corporation, Wyndmoor, Pa., a corporation of Pennsylvania
Filed Aug. 14, 1964, Ser. No. 389,735
7 Claims. (Cl. 198—185)

This invention relates to conveyor diverter mechanisms and more particularly to mechanisms for transferring objects from a main conveyor to a branch conveyor.

Many forms of apparatus for achieving such transfer have been proposed, but all have exhibited one or more of certain shortcomings. Among these shortcomings are inability to handle objects traveling at high speeds, inability to handle objects of different dimensions, unreliability, tendency to jam, and so forth.

Diverter apparatus is known which overcomes all but a few of the above-noted shortcomings.

This known form of diverter mechanism employs branch conveyors forming obtuse angles with the main conveyor and a pair of friction wheels or sheaves generally aligned with the center line of each branch conveyor, one sheave being located within the boundaries of the main conveyor bed and the other beyond those boundaries, within the bed of the branch conveyor. Of these sheaves, which may or may not be connected by a belt passing over both, at least the one located within the main conveyor bed is lowered below the level of that bed when transfer of objects to the branch conveyor is not desired, and raised above that level when transfer is desired. This type of prior art diverter apparatus is disclosed in U.S. Patent No. 3,018,073, issued January 30, 1962, in the name of Robert V. Burt.

An important remaining shortcoming of the type of diverter mechanism which is described above, and which is disclosed in the said Burt patent, is its difficulty in dealing with objects which, although all fitting within the width of the beds formed by both the main conveyor and its branch or branches, have dimensions such that different ones of these objects occupy widely disparate fractions of this bed width.

It is therefore an object of the invention to provide an improved conveyor diverter mechanism.

It is another object of the invention to provide an improved conveyor diverter mechanism capable of handling objects having widely disparate dimensions measured in the direction of the conveyor bed width.

It is still another object to provide a conveyor diverter mechanim free from the same shortcomings of prior art mechanisms, such as the mechanisms disclosed in the said Burt patent, and further capable of handling, without difficulty, objects of widely disparate widths.

These and other objects which will appear are accomplished by means of a mechanism which includes, for each branch conveyor, a plurality of pairs of friction wheels or sheaves.

The members of each such pair are in alignment with each other and parallel to the center line of the branch conveyor bed. One member of each pair is located within the confines of the main conveyor bed. The other is outside these confines, but within those of the branch conveyor bed. The different pairs are spaced from each other across the width of the branch conveyor bed and those sheaves which lie within the confines of the main conveyor bed are staggered across the width of that bed so that different ones of these sheaves are located at different points along the length of the main conveyor bed. At least those sheaves which are located within the confines of the main conveyor bed are vertically reciprocable between a position in which their topmost surfaces lie below the level of the main conveyor bed and one in which these surfaces lie above the main conveyor bed level.

Figure 2:
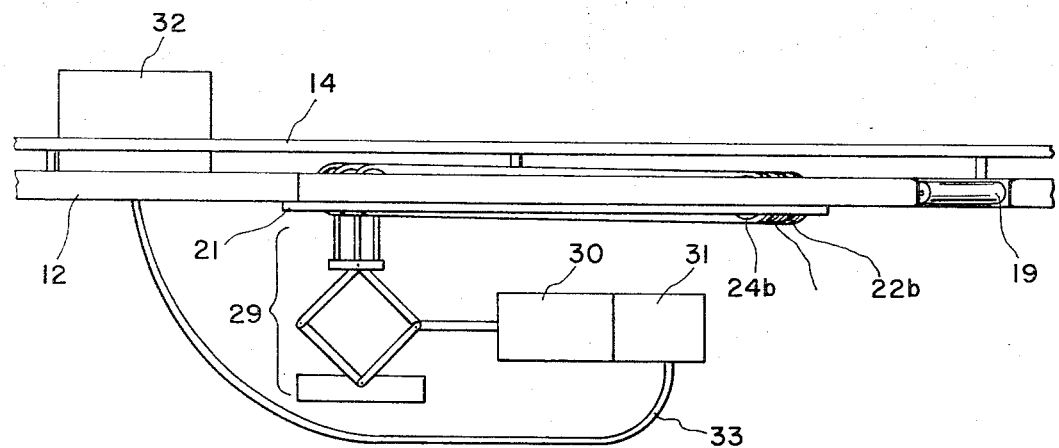

For further details reference may be had to the description which follows, in the light of the accompanying drawings, wherein:

FIGURE 1 is a simplified top view of main and branch conveyor sections incorporating a preferred embodiment of the invention, and
FIGURE 2 is a side view of FIGURE 1.

In both figures, the same reference numerals designate corresponding parts.

Referring now to FIGURE 1, the equipment illustrated therein comprises a segment of a main conveyor 10, which may be of conventional construction except as hereinafter noted. This conveyor includes parallel side rails 11, 12, rollers 13 powered in any conventional manner, and a guide rail 14 which extends above the bed of the conveyor along one side. The direction of motion of objects along the main conveyor is indicated by arrow 15. The rollers 13 are preferably skewed in such a way that these objects are directed into sliding engagement with the guide rail 14 as they travel along the conveyor segment shown in the drawing.

A segment 16 of a branch conveyor forms a junction with the main conveyor 10, extending away from the main conveyor in a direction forming an obtuse angle with the portion of the main conveyor immediately upstream from the junction. This branch conveyor also comprises conventional side rails 17, 18 and rollers 19 powered so as to provide motion of objects along the branch conveyor in the direction away from the main conveyor, i.e. in the direction of arrow 20 in FIGURE 1.

Recessed partly into the main conveyor and partly into the branch conveyor is a frame 21 defining a space within which are positioned certain elements of a diverter mechanism embodying the present invention. Frame 21 may be made of metal rails generally similar to conveyor side rails 11, 12, 17 and 18, and is depressed below the surface of the conveyor beds so as not to interfere with the passage of objects along the top surfaces of rollers 13 and 19. Where these rollers have to be segmented in order to accommodate frame 21, the frame 21 may be used to support one end of the segmented rollers.

Within the space defined by frame 21 are positioned three pairs of sheaves 22a, 22b, 23a, 23b, 24a and 24b. Sheaves 22a and 22b are connected by a belt 25, encircling the two sheaves and preferably thick enough to protrude above the flanges of the sheaves. Sheaves 23a and 23b are similarly connected by a belt 26, and sheaves 24a and 24b are similarly connected by a belt 27. Sheaves 22b, 23b and 24b may be mounted on a common axle 28 secured to frame 21 in such a position that the topmost surfaces of all the belts, where these pass over these sheaves, are at or slightly above the level of the adjacent portions of the branch conveyor bed. Sheaves 22a, 23a and 24a, although mounted on separate axles, are mounted on a common supporting frame, which may take any conventional form such as that illustrated diagrammatically at 29 in FIGURE 2 of the drawings.

The three pairs of sheaves are driven by conventional driving means connected, for example, to the common axle 28 in such a way that the top surfaces of the belts encircling these sheaves impart to objects in engagement with these belts a motion in the direction of arrow 20 and at a speed slightly in excess of that imparted by rollers 13 or 19.

The supporting frame 29 is actuatable in any conventional manner, such as by a hydraulic actuator 30 causing the frame 29 to perform a scissors motion, to cause controllable up and down movement of the sheaves 22a, 23a and 24a supported thereby between an extreme upward position in which the top surfaces of the belts passing over these sheaves protrude slightly above the level of the adjacent portions of the main conveyor bed and an extreme downward position in which these top surfaces are depressed below the conveyor bed level.

The actuator 30 may be electrically controlled by a conventional controller 31 which, in turn, receives electrical command signals determining its control effect upon actuator 30 from a photoelectric detector system 32. This detector system is mounted along the side rail 11 of conveyor 10, upstream from the diverter mechanism, and is connected electrically to controller 31 as by a cable 33. This detector system 32 may be of any of several known forms capable of identifying objects passing the detector as they move along the main conveyor toward the diverter. Detector system 32 may, for example, take the form described and illustrated in copending U.S. Patent application Serial No. 775,408, filed November 21, 1958, now U.S. Patent No. 3,152,256, in the names of Ray A. Zuck and Robert C. Hilliard and assigned to the assignee of the present invention.

When an object to be diverted to branch conveyor 16 is identified, the detector system 32 emits an electrical signal which passes through cable 33 to controller 31. This controller responds by controlling actuator 30 so as to raise support frame 29 to its uppermost position. In that position, the belts passing over sheaves 22a, 23a and 24a protrude above the main conveyor bed level, and the undersurface of the object moving along the main conveyor is therefore engaged by these belts and the object diverted onto the branch conveyor. When other objects are identified by detector system 32, a different signal is conveyed to controller 31, which responds by causing actuator 30 to retract frame 29 to its lowermost position. In that position, the undersurfaces of the objects in question are not engaged by the belts passing over sheaves 22a, 23a, and 24a, and these objects therefore continue along the main conveyor 10 past the branch conveyor 16.

In accordance with the present invention, and as illustrated in the drawings of this case, the ends of the belts 25, 26 and 27, which first engage any object moving along the main conveyor, are not only displaced from each other across the width of the main conveyor bed, but are also displaced from each other along the length of the main conveyor.

I have found that this enables the diverter mechanism not only to handle objects of widely different widths, but to do so with unexpected freedom from damaging shocks and jolts. Moreover, the tendency of other diverter mechanisms to jam is greatly reduced.

In an arrangement such as illustrated in the drawings, in which the main conveyor rollers are skewed to guide objects along guide rail 14, the preferred arrangement is to have sheave 22a, which is that nearest the guide rail 14, positioned farthest upstream along the main conveyor 10, with sheaves 23a and 24a, which are progressively further away from guide rail 14, also positioned progressively farther downstream along the main conveyor.

It will be understood that many changes and modifications can be made to the specific embodiment described and illustrated herein without departing from the inventive concept. Accordingly I desire that concept to be limited only by the appended claims.

I claim:
1. A mechanism for directing objects moving along the bed of a first conveyor onto the bed of a second conveyor, said mechanism comprising:
   means for contacting said moving objects from below and impelling them in the direction of said second conveyor bed, said means having a plurality of discrete portions spaced from each other in a direction transverse to said second conveyor direction, each said portion having an upstream end for making initial contact with said objects, different ones of said upstream ends being positioned at progressively staggered points along both the width and length of said first conveyor bed; and means for reciprocating said portions to position them alternately above and below the bed of said first conveyor.

2. A mechanism for diverting objects from a main conveyor to a branch conveyor forming an obtuse angle with the upstream direction of said main conveyor, said mechanism comprising:
   a plurality of laterally spaced belt and pulley sets, each set comprising one pulley within the bed of said main conveyor and a second pulley within the bed of said branch conveyor, different ones of said pulleys within said main conveyor bed being positioned at progressively different points along the downstream length of said main conveyor;
   means for causing at least some of said pulleys within the bed of said main conveyor to move up and down;
   and means for rotating at least some of said pulleys so as to impart to said belts a motion causing objects in engagement with their topmost surfaces to move in a direction from said main conveyor to said branch conveyor.

3. The mechanism of claim 2 further characterized in that different ones of said belt and pulley sets are laterally spaced from each other at substantially equal intervals across the width of said main conveyor bed.

4. The mechanism of claim 2 further characterized in that each belt has a width equal to a small fraction of the width of said cain conveyor bed.

5. The mechanism of claim 2 further characterized in that each said belt extends substantially parallel to the direction of said branch conveyor.

6. The mechanism of claim 2 further characterized in that said up and down moving means is controlled by indications derived from said objects on said main conveyor before reaching said movable pulleys.

7. The mechanism of claim 8 further comprising means for guiding objects on said main conveyor toward one edge of said main conveyor bed and characterized in that said pulley positioned at a point furthest upstream along said main conveyor is also closest to said one edge.

References Cited by the Examiner

UNITED STATES PATENTS

| 3,018,873 | 1/1962 | Burt _____ 198—78 |
| 3,134,476 | 5/1964 | Pierson _____ 198—103 |
| 3,138,238 | 6/1964 | De Good _____ 198—185 X |
| 3,170,572 | 2/1965 | Harrison _____ 209—74 |

EVON C. BLUNK, *Primary Examiner.*

RICHARD E. AEGERTER, *Examiner.*